I. O. HEFNER.
TRUCK.
APPLICATION FILED JULY 19, 1913.
1,099,363.
Patented June 9, 1914.
2 SHEETS—SHEET 1.
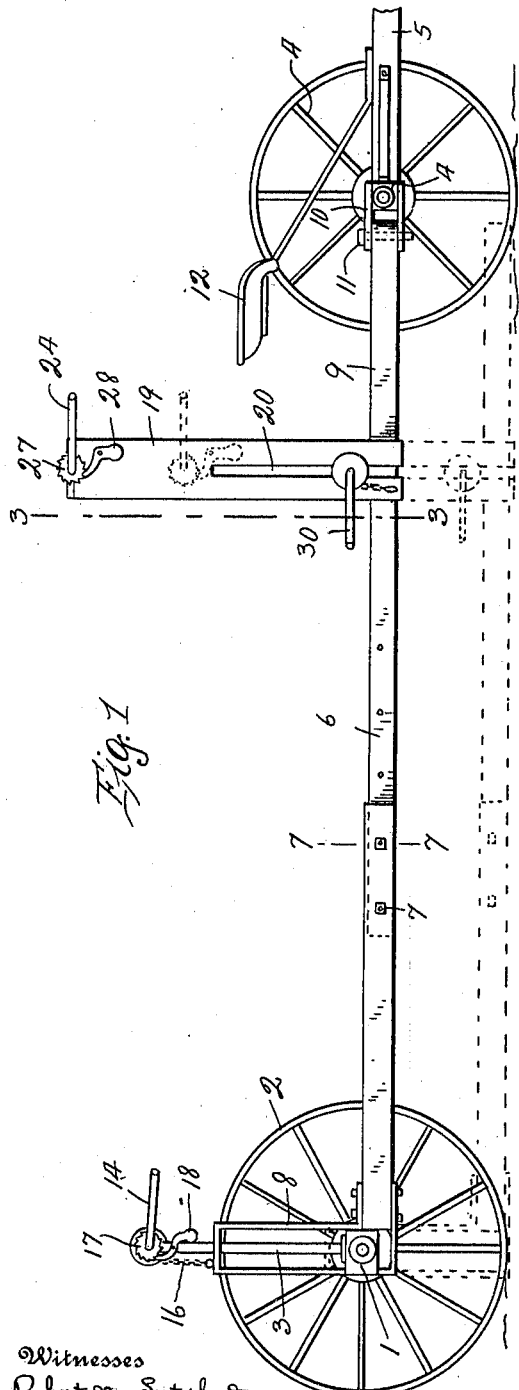
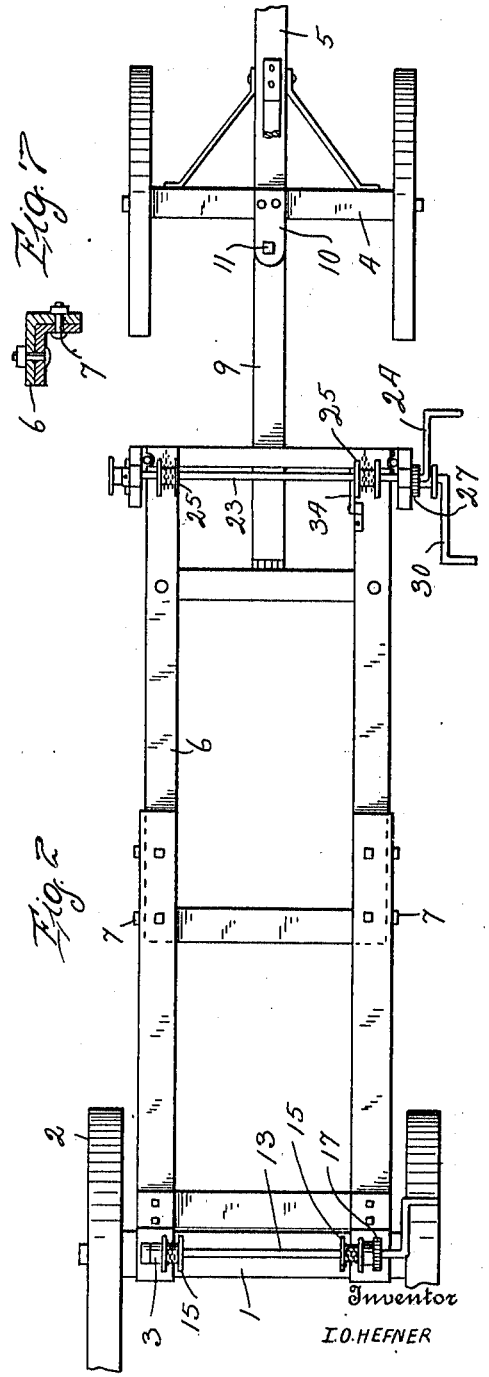
Inventor
I. O. HEFNER
Witnesses
Robert M. Sutphen
V. J. Dowrick
By Watson E. Coleman
Attorney

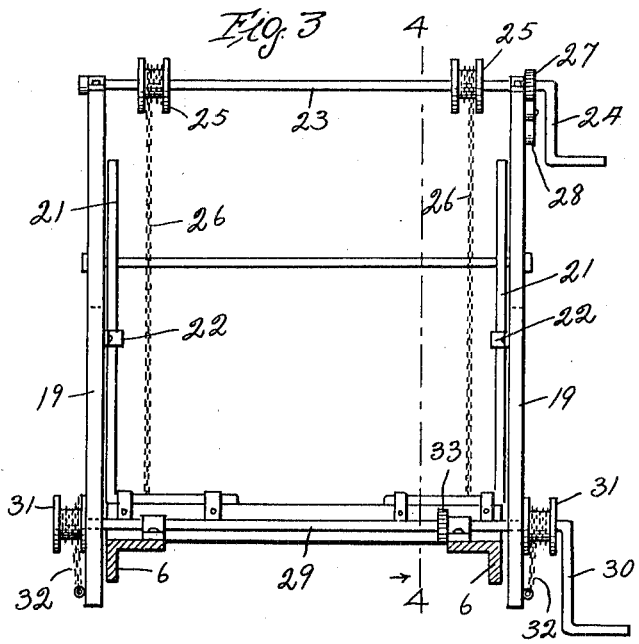
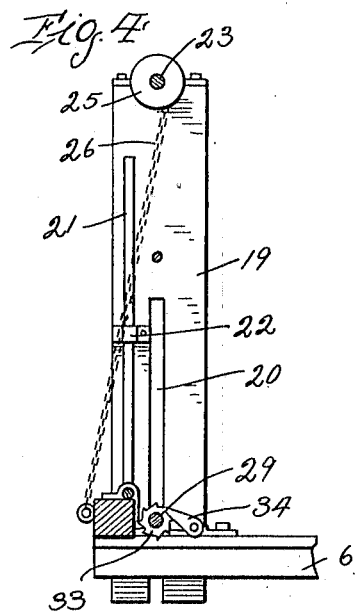
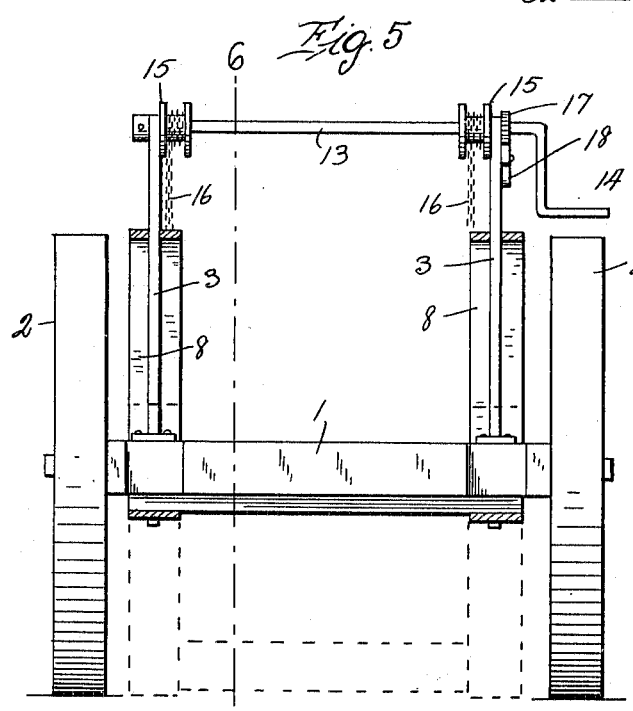
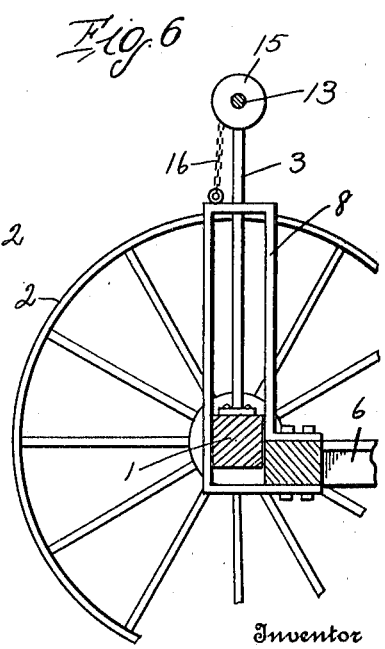

UNITED STATES PATENT OFFICE.

IVORA OWEN HEFNER, OF LEXINGTON, ILLINOIS.

TRUCK.

1,099,363.  Specification of Letters Patent.  Patented June 9, 1914.

Application filed July 19, 1913. Serial No. 780,055.

*To all whom it may concern:*

Be it known that I, IVORA OWEN HEFNER, a citizen of the United States, residing at Lexington, in the county of McLean and State of Illinois, have invented certain new and useful Improvements in Trucks, of which the following is a specification, reference being had to the accompanying drawings.

This invention relates to new and useful improvements in trucks and more particularly to a truck for carrying farm implements from place to place on a field and the primary object of the invention is to provide a device of this character having a vertically movable platform thereon.

A further object of the invention resides in providing improved means for raising and lowering the platform with respect to the walls of the device and a still further object resides in providing a device which is simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claims.

In the accompanying drawings forming a part of this application, Figure 1 is a side elevation of the device set up in position to be propelled from place to place, and showing in dotted lines the position of the platform when lowered into operative position. Fig. 2 is a plan view thereof. Fig. 3 is a vertical section as seen on line 3—3, Fig. 1. Fig. 4 is a similar view as seen on line 4—4, Fig. 3, looking in the direction of the arrow. Fig. 5 is a vertical section through the device showing the rear operating means. Fig. 6 is a vertical section as seen on line 6—6, Fig. 5; and Fig. 7 is a similar view as seen on line 7—7, Fig. 1.

In describing my invention, I shall refer to the drawings in which similar reference characters designate corresponding parts throughout the several views and in which—

1 indicates an axle suitably supporting the rear wheels 2 and mounted on said axle is a frame 3, the purpose of which will be hereinafter and more particularly described. A front truck 4 is provided having the tongue 5 thereon and a platform or supporting frame 6 is adapted to be supported between the front and rear trucks. This platform or supporting frame 6 is formed preferably of angle iron and formed in sections secured together by means of the bolts 7, whereby to admit of adjustability thereof to accommodate objects of various sizes.

Secured to the rear end at the side edges of the platform or supporting frame 6, are the vertical guide frames 8, each of which is formed of a single bar of metal bent upon itself and secured to the frame, whereby to form the vertical guides on the device. These vertical guide frames movably receive therethrough the rear axle 1 and through this construction, it will be seen that the frame or platform 6 is capable of vertical movement with respect to the rear truck. I have provided a means for retaining the rear end of the frame 6 in any adjusted position with respect to the axle 1, which will be hereinafter and more particularly described.

The forward end of the platform or supporting frame 6 has secured thereto and extending longitudinally thereof, an arm 9 which is received in a keeper 10 carried on the bolster of the front truck and a pin 11 is removably disposed through said keeper and through the forward end of the arm 9, so as to pivotally secure the front truck thereto. A seat 12 is also carried on the front truck for the driver of the vehicle.

As stated and as will be seen from the structure shown and described, the rear end of the frame or platform is movable vertically, with respect to the axle 1 and I have provided a means for supporting the same in various adjusted positions. To this end, the rod or shaft 13 is rotatably mounted on the upper portion of the frame 3, one end of said rod or shaft being designed to form a crank or handle member 14. Carried on said rod or shaft, are the drums 15, around which are wound the supporting chains 16 and the ends of these supporting chains are suitably engaged with the guide frames 8 carried on the rear end of the platform or supporting frame 6. Through this medium, it will be seen that the platform 6 may be raised and lowered and in order to retain the same in any adjusted position, a ratchet 17 is provided on the shaft 13 and a gravity pawl 18 is pivotally mounted on the frame 3 to engage the teeth of said ratchet 17. It will thus be seen that the frame or platform may be raised or lowered and held in any adjusted position with respect to the rear axle.

In raising and lowering the platform 6, it is necessary, of course, to remove the connection thereof with the front truck and I have provided an improved means for supporting the forward portion of the frame or platform 6 after the front truck has been removed. To this end, a frame 19 is provided, the side bars of which extend on the outside of the sides of said frame or platform 6 and each side bar is provided with a slot 20. Secured to the side bars of the frame 6 and extending upwardly therefrom, are the guide frames 21 which are slidably received through keepers 22 carried on the inner faces of the side bars of the frame 19. Mounted on the upper end of the frame 19 to rotate thereon, is a shaft or rod 23, the one end of which is designed to form a crank or handle member 24. Mounted on the shaft or rod 23 are the drums 25, on which are carried the chains 26, the free ends of the latter being engaged with the side bars of the frame 6. Mounted on the rod or shaft 23, adjacent the handle member, is a ratchet 27 and a gravity pawl 28 is pivotally carried on one side bar of the frame 19 for engagement with the teeth of said ratchet to lock the shaft 23 in any adjusted position. Rotatably mounted on the frame 6, and extending transversely thereof, is a shaft 29, one end of which is designed to form a crank or handle member 30. This shaft or rod is received through the vertical slots 20 of the side bars of the frame 19 and acts as a guide for the latter. Mounted on the shaft 29, outside of the side bars of the frame 19, are the drums 31, around which are wound the chains 32, the free ends of the latter being engaged with loops or eyes on the lower ends of the side bars of the frame 19. Also carried on the shaft 29, is a ratchet 33 and an additional gravity pawl 34 pivotally carried on the frame 6, is adapted for engagement with the teeth of said ratchet.

In operation, assuming that the device is set up for use, as shown in Fig. 1, should it be desired to convey an implement on a farm from one place to another, this vehicle is first conveyed to the point at which the implement is located. The crank 30 is then turned to lower the frame 19 with respect to the frame or platform 6 and after the frame 19 is turned, the crank 24 is lowered to take up the slack in the chains 26. When this frame has been properly lowered and the pawl 34 engaged with the ratchet 33 to lock said frame in its lowered position, the forward truck is removed from the reach or arm 9 and the frame or platform 6 is then ready to be lowered. The crank 14 is then turned to lower the rear end of the platform or supporting frame 6, and the crank 24 is then turned in the proper direction to lower the forward end of the frame 6 and when the frame or platform 6 has been lowered into engagement with the ground, the particular implement on the field may be moved to a position thereon. The rear end of the platform or frame 6 is then raised by turning the crank 14 and the forward end thereof raised by turning the crank 24. The front truck is then applied to the reach 9 and then the crank 30 is turned to raise the frame 19 to a position as shown in Fig. 1. The crank 24 is then turned to take up the slack in the chains 16 and the device is then ready to be driven away. In view of the particular connection between the front truck and the reach, it will be seen that the device is capable of making very short turns in the field and in view of the adjustment of the frame or platform 6, the same is capable of receiving thereon implements of various sizes.

From the foregoing it will be seen that I have provided a device which is simple and durable in construction, inexpensive to manufacture and one which will be very efficient and useful in operation, and while I have particularly described the elements best adapted to perform the functions set forth, it is obvious that various changes in form, proportion and in the minor details of construction may be resorted to without departing from the spirit or sacrificing any of the principles of the invention.

Having thus described this invention, what is claimed is:—

1. A vehicle of the class described comprising front and rear trucks, a supporting platform removably secured to the front truck, means in connection with the rear end of said platform and said rear truck to adjustably support the former on the latter, a supporting frame carried on the forward portion of said supporting platform and capable of vertical movement with respect thereto, means for raising and lowering said frame with respect to the platform, and additional means in connection with said platform and supporting frame for raising and lowering the former with respect to the ground when the latter is lowered and the front truck has been removed.

2. A vehicle of the class described comprising front and rear trucks, an adjustable supporting platform removably secured to the front truck, means in connection with the rear end of said platform and the rear truck to adjustably support the former on the latter, a supporting frame for said platform applied to the forward portion of the latter and capable of vertical movement with respect thereto, means for raising and lowering said supporting frame with respect to the platform, said frame when lowered into engagement with the ground being adapted to support the forward end of said platform, whereby said front truck may be removed, and means in connection with said supporting frame and said platform for raising and lowering the latter with respect to the ground when said supporting frame has been disposed to its operative position and the front truck is removed.

In testimony whereof I hereunto affix my signature in the presence of two witnesses.

I. OWEN HEFNER.

Witnesses:
B. W. SWEET,
BESSIE HEFNER.

Copies of this patent may be obtained for five cents each, by addressing the "Commissioner of Patents, Washington, D. C."